United States Patent [19]

Kubli et al.

[11] 3,778,587

[45] Dec. 11, 1973

[54] CORED WIRE ELECTRODE HAVING 200 TO 2000 PPMO$_2$

[75] Inventors: Robert A. Kubli, Scotch Plains, N.J.; Frederick H. Sasse, Yorktown Heights, N.Y.; Gerald D. Uttrachi, Westfield, N.J.; Le Roy L. Van Dyke, Mahopac; Masahiro Nakabayashi, Dobbs Ferry, both of N.Y.

[73] Assignee: Union Carbide Corporation, New York, N.Y.

[22] Filed: Dec. 27, 1971

[21] Appl. No.: 212,756

[52] U.S. Cl.............. 219/146, 117/202, 117/207, 148/26, 219/73, 219/126
[51] Int. Cl............................................. B23k 35/22
[58] Field of Search.................... 148/26; 29/191.2, 29/194; 219/145, 146, 137, 73, 126; 117/202-207

[56] References Cited

UNITED STATES PATENTS

| | | | |
|---|---|---|---|
| 3,394,238 | 7/1968 | Wilcox | 219/146 |
| 3,424,892 | 1/1969 | Wilcox | 219/146 |
| 3,218,432 | 11/1965 | Peck | 219/145 |

*Primary Examiner*—J. V. Truhe
*Assistant Examiner*—George A. Montanye
*Attorney*—Paul A. Rose et al.

[57] ABSTRACT

A hollow tubular sheath containing manganese and silicon ingredients with iron powder, the total wire chemistry containing between 200 and 2000 parts per million oxygen.

5 Claims, No Drawings

CORED WIRE ELECTRODE HAVING 200 TO 2000 PPMO

This invention relates to consumable electrodes for electric welding and, more particularly, to a cored wire electrode, sometimes referred to as a tubular electrode, for welding in a method utilizing a welding flux composition.

The electroslag method of welding metals is becoming more widely used in industry. Up until now, in most applications solid consumable wires have been used with the electroslag flux materials. One problem, however, has been the difficulty in achieving consistently good weld impact propreties with solid wires. It was discovered that a tubular electrode having a core of metallic ingredients as specified hereinafter produced consistently good weld impact properties; that is, the weld metal properties consistently exceeded AWS minimum standards of 15 ft-lbs. C.V.N. at 0° F. in mild steels such as 1971 A.S.T.M. A–36 and A–441 which have the following nominal compositions: A–36; carbon .26 max.; manganese 0.80–1.20; Si 0.15–0.30; balance iron. A–441; carbon 0.22 max.; manganese 0.85–1.25; Si 0.30 max.; copper 0.20 min.; balance iron.

Accordingly, it is the main object of this invention to provide a consumable electrode wire having a core of metallic ingredients in a mild steel sheath.

It is another object to provide such a wire for use in welding methods wherein a welding flux is utilized.

Another object is to provide such a wire for electroslag welding.

Yet another object is to provide a metallic core wire for use in electroslag welding of mild steels which will consistently produce welds having impact properties in excess of 15 ft-lbs. C.V.N. at 0° F., while maintaining strength, ductility and bend requirements.

These and other objects will become apparent from the following description and examples which are provided to illustrate to one skilled in the art the concept of the invention.

While the description and examples are primarily directed to the electroslag method of welding, it is to be understood that the cored wire of this invention may also be utilized in the submerged arc process.

Flux cored wires are well known in the art. Such wires usually contain fluxing materials such as oxides, carbonates, etc., in addition to metallic elements. The wire of this invention can be characterized as a metal core wire since it contains only metals in the core material. The core material is preferably composed of manganese metal, ferrosilicon, which is 50 percent iron and 50 percent silicon and iron powder.

It has been found that in order to achieve the mechanical properties desired in the weld metal and specifically the impact properties desired, the oxygen content of the wire must be kept below about 2000 ppm. Accordingly, the iron powder which usually is the main contributor of oxygen in a core wire should be controlled or carefully selected in order that the wire not exceed 2000 ppm oxygen. Cored wire compositions having greater than 2000 ppm resulted in welds which were below the 15 ft-lbs. C.V.N. impact properties required for mild steels by the AWS standards. Oxygen contents in excess of 2000 ppm also have a deleterious effect on other mechanical properties such as strength, ductility and bend properties. It is theorized that the oxygen content of the wire should not be below 200 ppm in order to achieve active oxidation of elemental manganese and silicon in the weld puddle to scavenge impurities such as sulfur or tie them up in a harmless form.

The chemical analysis of the cored wire of the invention, in its broadest aspects, based on the total weight of the electrode is generally as follows: about 0.05 to about 0.12 percent carbon; about 1.2 to about 2.4 percent manganese; about 0.20 to about 0.50 silicon; and the balance iron, with the oxygen content between about 200 ppm and 2000 ppm. The above chemical analysis for carbon, manganese and silicon was determined by a standard wet chemical analysis technique described by ASTM E 30–70. The oxygen analysis was determined by Fast Neutron Activation Analysis.

The above chemical analysis can be achieved with a 20 weight per cent core containing the following ingredients: about 4.5 to 10.5 core weight percent of manganese; about 1.0 to 2.5 core weight percent silicon; and the balance iron powder, the oxygen content of the wire being about 1000 ppm.

A typical composition for the wire of the invention with 20 percent core is as follows: carbon 0.07 weight percent; manganese 1.90 weight percent; silicon 0.35 weight percent; the balance iron, the wire having between about 200 ppm and 2000 ppm oxygen.

In a preferred form of the invention, a mild steel sheath has a core which is 20 weight per cent of the total electrode and which contains 7.9 core weight percent manganese; about 3.3 core weight percent ferrosilicon, which provides 1.65 core weight per cent silicon and the balance iron powder; the total oxygen content of the wire being about 1000 ppm.

It should be understood that the core weight per cent may be varied, preferably between 10 and 40 weight percent of the total electrode and the composition of such core varied accordingly to produce the overall wire chemical analysis and oxygen content hereinabove set forth and defining the scope of the invention.

Having described the invention in a general way and with respect to certain preferred embodiments, the following Examples and data are provided so that those skilled will know how to practice the invention:

EXAMPLE I

A wire A consisting of a mild steel sheath and a twenty (20) weight percent core ± 2 percent had an overall wire chemistry of carbon 0.08 weight per cent; manganese 1.70 weight percent; silicon 0.26 weight percent; balance iron mainly in the form of iron powder in the core. The oxygen content was 780 ppm.

Test welds were made using the electroslag process with a flux material identified and sold under the trade name as Linde 124 containing about 15–25 weight per cent CaO; 12–18 weight percent $CaF_2$; 5–15 weight percent MgO; 25–40 weight per cent $SiO_2$; and 10–20 weight percent $Al_2O_3$. Consumable guide tubes were used, coated with a similar flux material. The welds were made at 550 amps d.c.r.p. at 35–36 volts. The base materials was A–441, defined above.

Mechanical properties were as follows: 56,400 psi yield strength; 77,400 psi ultimate tensile strength; 29.4 percent elongation in 2 inch gauge length. The impact values were 29.2; 38.5; 32.9; 33.1 and 19.3 ft-lbs. C.V.N. at 0°F. which give an AWS average of 31.7 ft-lbs. C.V.N. at 0°F. The welds also passed the guided side bend tests.

EXAMPLE II

A wire B was used in this Example. This wire had the same chemical analysis as wire A, except the source of ingredients used such as the source of the iron powder resulted in an oxygen content of 1345 ppm. The welding conditions were the same as in Example I.

Mechanical properties were as follows: 53,200 psi yield strength; 80,100 ultimate tensile strength; 26.9 elongation in a 2 inch gauge length. The impact values were 28.6; 32.5; 21.9; 33.3; 30.4 ft-lbs. at 0°F. which gives an AWS average of 30.5 ft-lbs. C.V.N. at 0°F. The welds also passed the guided side bend tests.

EXAMPLE III

A wire C which had the same chemical analysis as wires A and B except, the wire contained 2680 ppm. oxygen was used to make test welds under the same conditions indicated in Examples I and II. The weld failed the bend tests; therefore, the weld was totally unsatisfactory.

EXAMPLE IV

In this test a solid wire having carbon of 0.08 weight per cent; manganese of 1.24 weight percent; silicon of 0.32 weight per cent and an oxygen content of less than 100 ppm was used under identical welding conditions to those set forth in Example I. The yield strength of the weld metal was 51,100 psi. The ultimate tensile strength was 71,600 psi. The elongation was 28.5 percent. The impacts were 16, 16, 16, 17 and 24 ft-lbs. C.V.N. at 0°F. which gives an AWS average of 16.3 ft-lbs. C.V.N. This same wire used in many more tests actually produced impact values which fifty per cent of the time were below 15 ft-lbs. C.V.N. at 0°F. If a wire does not consistently, by which is meant one hundred percent of the time, meet the AWS minimum standard, the wire cannot be qualified.

Many tests with other solid wires such as AWS-E70S-3 and AWS-EM-13K having similar compositions to that of the invention produced weld metal which would fail to meet the standard setup by the American Welding Society (AWS). For example, AWS-E70S-3 wire which usually contains carbon 0.06–0.15; manganese 0.90–1.40 and silicon 0.45–0.70 produced weld metal having impacts ranging from 11 to 30 ft-lbs. C.V.N. at 0°F. AWS-EM-13K wire which usually contains 0.07 to 0.19 carbon; 0.90 to 1.40 manganese and 0.45 to 0.70 silicon produced weld metal having impacts ranging from 8–22 ft-lbs. C.V.N. at 0°F.

The above data indicates that a cored wire having an oxygen content of from 200 ppm to 2000 ppm will consistently produce impact properties in weld metal in excess of 15 ft-lbs. C.V.N. at 0°F. in mild steel metal. On the other hand, solid wire will only, by chance, occasionally produce a weld having satisfactory impact values. It is postulated that a reason for improved mechanical properties when using a cored wire having essentially the same chemistry as a solid wire with the exception that oxygen content is maintained in a critical range may be the type of metal transfer obtained with a cored wire in electroslag welding. Cored wire produces smaller droplets in the molten puddle which results in a different solidification pattern in the weld metal from that obtained with solid wire. Solid wires produce large globular droplets of metal. The difference in solidification patterns are believed to affect the mechanical properties.

Having described the invention in general and specific terms, it should be understood that minor modifications, not specifically referred to, may be made without departing from the spirit and scope of the invention.

What is claimed is:

1. A consumable wire electrode comprising a hollow sheath of mild steel and a core material comprising from about 10 to about 40 weight percent of the total electrode, the total wire chemistry being composed of 0.05 to 0.12 weight percent carbon; 1.2 to 2.4 weight percent manganese; 0.20 to 0.50 weight percent silicon; oxygen between about 200 ppm and 2000 ppm and the balance iron, including iron powder in the core.

2. A wire according to claim 1 wherein the core material is about 20 weight percent of the total electrode.

3. A wire according to claim 2 wherein the core material consists of about 4.5 to about 10.5 core weight percent manganese; about 1.0 to about 2.5 weight percent silicon; oxygen about 1000 ppm and the balance iron powder.

4. A wire according to claim 3 wherein the manganese is about 7.9 core weight percent, the silicon is about 1.65 core weight percent; and the iron powder is the balance of the core weight percent.

5. A consumable wire electrode comprising a hollow sheath of mild steel and a core material comprising 20 weight percent of the total electrode, the total wire chemistry being composed of 0.07 weight percent carbon; 1.90 weight percent manganese; 0.35 weight percent silicon; oxygen between about 200 ppm and 2000 ppm and the balance iron, including iron powder in the core.

* * * * *